United States Patent
Li et al.

(10) Patent No.: US 10,049,077 B2
(45) Date of Patent: Aug. 14, 2018

(54) HANDHELD DEVICE FOR ELDERLY PEOPLE

(75) Inventors: Ying Li, Shanghai (CN); Yutian Wen, Shanghai (CN); Bo Huang, Beijing (CN)

(73) Assignee: Intel Corporation, Santa Clara, CA (US)

(*) Notice: Subject to any disclaimer, the term of this patent is extended or adjusted under 35 U.S.C. 154(b) by 383 days.

(21) Appl. No.: 11/478,460

(22) Filed: Jun. 30, 2006

(65) Prior Publication Data
US 2008/0005301 A1    Jan. 3, 2008

(51) Int. Cl.
*G06F 15/16* (2006.01)
*H04M 11/04* (2006.01)
*H04M 1/725* (2006.01)

(52) U.S. Cl.
CPC ........ *G06F 15/16* (2013.01); *H04M 1/72541* (2013.01); *H04M 1/72588* (2013.01)

(58) Field of Classification Search
CPC ............. G06F 15/16; H04M 1/72588; H04M 1/72541
USPC ...... 709/217; 455/404.1, 404.2, 411; 379/45
See application file for complete search history.

(56) References Cited

U.S. PATENT DOCUMENTS

| | | | | |
|---|---|---|---|---|
| 5,822,544 A | * | 10/1998 | Chaco | G06F 19/3418 705/2 |
| 5,835,907 A | * | 11/1998 | Newman | G08B 25/016 340/539.13 |
| 5,933,080 A | * | 8/1999 | Nojima | 340/426.19 |
| 5,946,618 A | * | 8/1999 | Agre et al. | 455/428 |
| 6,031,904 A | * | 2/2000 | An et al. | 379/201.02 |
| 6,125,281 A | * | 9/2000 | Wells | H04M 1/72552 455/412.1 |

(Continued)

FOREIGN PATENT DOCUMENTS

| | | |
|---|---|---|
| CN | 1434925 | 8/2003 |
| CN | 1549642 | 11/2004 |

(Continued)

OTHER PUBLICATIONS

Mikkonen, M., Vayrynen, S., Ikonen, V., and Heikkila, M. O. User and Concept Studies as Tools in Developing Mobile Communication Services for the Elderly. Personal and Ubiquitous Computing [online], Apr. 2002 [retrieved on Jan. 17, 2009]. Retrieved from the Internet<http://www.springerlink.com/content/ntx6bb64pmgmy025/fulltext.pdf>.*

(Continued)

*Primary Examiner* — Philip Chea
*Assistant Examiner* — Wing Ma
(74) *Attorney, Agent, or Firm* — Schwegman Lundberg & Woessner, P.A.

(57) ABSTRACT

The embodiments of the invention relate to a mobile computing device, such as a cell phone or "handheld" with expanded features and capabilities for elderly persons, children, and others with either health-related issues or the need to monitoring by friends, family members, healthcare personnel, or others. Illustratively, the invention is a middleware application for a handheld/cellular device, that may be remotely configurable, and interacts with network service providers to provide a single-button solution for elderly people requiring assistance and for the notification of multiple parties regarding the nature of the required assistance.

30 Claims, 12 Drawing Sheets

Elder Phone Project

(56) References Cited

U.S. PATENT DOCUMENTS

| | | | |
|---|---|---|---|
| 6,131,067 A * | 10/2000 | Girerd | G01S 19/09 340/989 |
| 6,198,914 B1 * | 3/2001 | Saegusa | 455/404.2 |
| 6,292,542 B1 * | 9/2001 | Bilder | 379/45 |
| 6,302,844 B1 * | 10/2001 | Walker et al. | 600/300 |
| 6,397,054 B1 * | 5/2002 | Hoirup et al. | 455/404.1 |
| 6,512,456 B1 * | 1/2003 | Taylor, Jr. | 340/573.1 |
| 6,567,502 B2 * | 5/2003 | Zellner et al. | 379/45 |
| 6,771,742 B2 * | 8/2004 | McCalmont et al. | 379/45 |
| 6,792,081 B1 * | 9/2004 | Contractor | 379/45 |
| 6,807,564 B1 * | 10/2004 | Zellner et al. | 709/206 |
| 6,813,498 B1 * | 11/2004 | Durga et al. | 455/456.1 |
| 6,838,998 B1 * | 1/2005 | Brown | G08B 21/0202 340/5.61 |
| 6,868,074 B1 | 3/2005 | Hanson | |
| 6,975,941 B1 * | 12/2005 | Lau | G01C 21/00 340/539.13 |
| 7,068,760 B2 * | 6/2006 | Binning | 379/45 |
| 7,071,821 B2 * | 7/2006 | Adamczyk et al. | 340/539.18 |
| 7,096,002 B2 * | 8/2006 | Hargett | 455/404.2 |
| 7,126,472 B2 * | 10/2006 | Kraus et al. | 340/539.18 |
| 7,177,397 B2 * | 2/2007 | McCalmont et al. | 379/45 |
| 7,238,156 B1 * | 7/2007 | Adamczyk | 600/300 |
| 7,286,648 B1 * | 10/2007 | Chang et al. | 379/45 |
| 7,356,345 B2 * | 4/2008 | Cunningham et al. | 455/466 |
| 7,433,672 B2 * | 10/2008 | Wood | 455/404.1 |
| 7,512,223 B1 * | 3/2009 | Albal et al. | 379/207.12 |
| 7,529,351 B2 * | 5/2009 | Binning | 379/45 |
| 7,529,537 B2 * | 5/2009 | Ford et al. | 455/404.1 |
| 7,905,832 B1 * | 3/2011 | Lau et al. | 600/300 |
| 8,050,686 B1 * | 11/2011 | Souissi et al. | 455/456.1 |
| 2001/0012281 A1 * | 8/2001 | Hall et al. | 370/338 |
| 2002/0013815 A1 * | 1/2002 | Obradovich | H04L 29/12122 709/204 |
| 2002/0101961 A1 * | 8/2002 | Karnik et al. | 379/45 |
| 2003/0036684 A1 | 2/2003 | Hood et al. | |
| 2003/0130866 A1 * | 7/2003 | Turner et al. | 705/2 |
| 2003/0139193 A1 | 7/2003 | Buckley | |
| 2004/0006492 A1 * | 1/2004 | Watanabe | 705/2 |
| 2004/0057340 A1 | 3/2004 | Charles-Erickson et al. | |
| 2004/0121784 A1 * | 6/2004 | Park | H04W 64/00 455/456.1 |
| 2004/0138807 A1 * | 7/2004 | Jha | H04W 4/02 455/456.2 |
| 2004/0162035 A1 * | 8/2004 | Petersen et al. | 455/90.1 |
| 2004/0176104 A1 | 9/2004 | Arcens | |
| 2004/0203902 A1 | 10/2004 | Wilson et al. | |
| 2005/0118999 A1 * | 6/2005 | Zhu | H04W 64/00 455/432.1 |
| 2005/0120219 A1 * | 6/2005 | Munetoh et al. | 713/176 |
| 2005/0151642 A1 * | 7/2005 | Tupler et al. | 340/539.18 |
| 2005/0164691 A1 * | 7/2005 | Payne | 455/419 |
| 2005/0170813 A1 * | 8/2005 | Choi | 455/411 |
| 2005/0176403 A1 * | 8/2005 | Lalos | 455/404.1 |
| 2005/0203771 A1 | 9/2005 | Achan | |
| 2005/0239477 A1 * | 10/2005 | Kim et al. | 455/456.1 |
| 2005/0265326 A1 * | 12/2005 | Laliberte | 370/389 |
| 2006/0025158 A1 * | 2/2006 | Leblanc | G01C 21/206 455/456.2 |
| 2006/0031399 A1 * | 2/2006 | Sherman et al. | 709/217 |
| 2006/0035631 A1 * | 2/2006 | White et al. | 455/418 |
| 2006/0073838 A1 * | 4/2006 | Kamali et al. | 455/456.1 |
| 2006/0172860 A1 * | 8/2006 | Estrella | 482/8 |
| 2006/0202009 A1 * | 9/2006 | Austin | G06Q 10/08 235/375 |
| 2006/0217105 A1 * | 9/2006 | Kumar et al. | 455/404.1 |
| 2007/0016676 A1 * | 1/2007 | Breuer | G06F 17/3056 709/225 |
| 2007/0038476 A1 * | 2/2007 | Sternlicht | G06F 19/327 705/2 |
| 2007/0064885 A1 * | 3/2007 | Ahuja | G07F 17/16 379/88.13 |
| 2007/0072625 A1 * | 3/2007 | Fournier | H04M 1/72527 455/456.1 |
| 2007/0085690 A1 * | 4/2007 | Tran | A61B 5/103 340/573.1 |
| 2007/0171047 A1 * | 7/2007 | Goodman | G01S 5/0072 340/539.13 |
| 2007/0173266 A1 * | 7/2007 | Barnes, Jr. | 455/456.1 |
| 2007/0189246 A1 * | 8/2007 | Molnar | H04L 29/06027 370/338 |
| 2007/0208816 A1 * | 9/2007 | Baldwin et al. | 709/206 |
| 2007/0280429 A1 * | 12/2007 | Binning | H04M 11/04 379/37 |
| 2012/0190380 A1 * | 7/2012 | Dupray | G01S 1/026 455/456.1 |

FOREIGN PATENT DOCUMENTS

| | | | |
|---|---|---|---|
| CN | 1765143 A | 4/2006 | |
| KR | 2002043527 A * | 6/2002 | H04W 8/24 |
| WO | 01/73466 | 10/2001 | |
| WO | 2004/075594 A1 | 9/2004 | |

OTHER PUBLICATIONS

Newton, H. "Middleware." in: Newton's Telecom Dictionary (20th ed.), San Francisco, CMP Books, 2004. p. 526. Ref. TK5102.N485 2004.*

State Intellectual Property Office (SIPO) of the People's Republic of China, Chinese Office Action, Application No. 200780019593.4, dated May 28, 2013, total of 24 pages including the translation.

Chinese Office Action with English translation issued in corresponding Chinese Application No. 200780019593.4, dated Apr. 20, 2012, 13 pages.

GB Examination Report dated Aug. 16, 2011.

CN Office Action dated May 18, 2011.

State Intellectual Property Office (SIPO) of the People's Republic of China, Chinese Office Action, Application No. 200780019593.4, dated Nov. 21, 2012, total of 8 pages.

International Preliminary Report on Patentability corresponding to PCT/US2007/072600, dated Jan. 6, 2009.

State Intellectual Property Office (SIPO) of the People's Republic of China, Chinese Office Action, Application No. 200780019593.4, dated Oct. 30, 2013, total of 26 pages including the translation.

State Intellectual Property Office (SIPO) of the People's Republic of China, Chinese Patent Application No. 200780019593.4, dated Apr. 9, 2014.

* cited by examiner

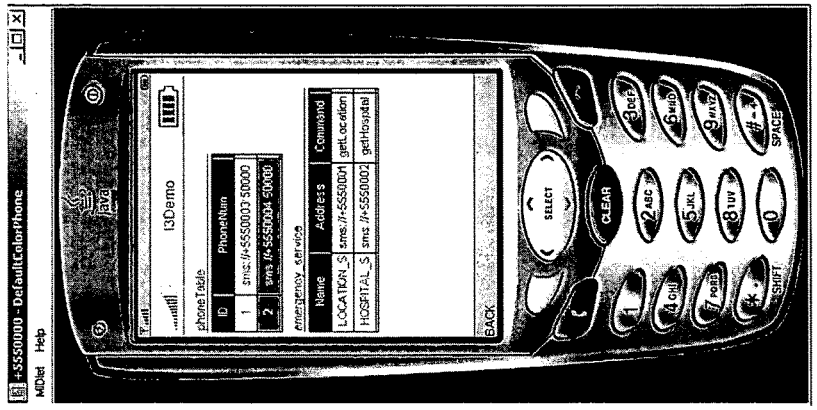
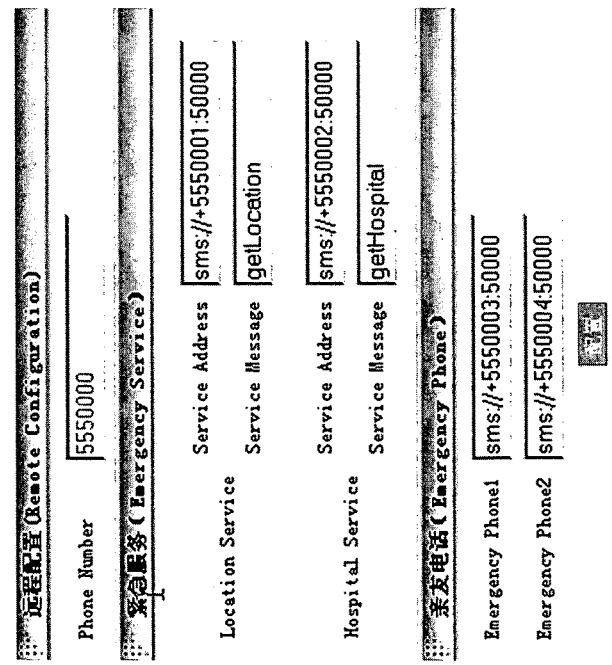
Fig. 7

Scenario 5 Demo
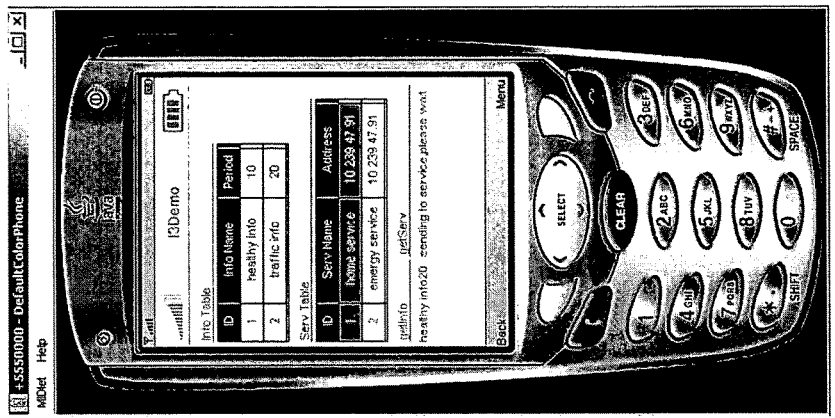
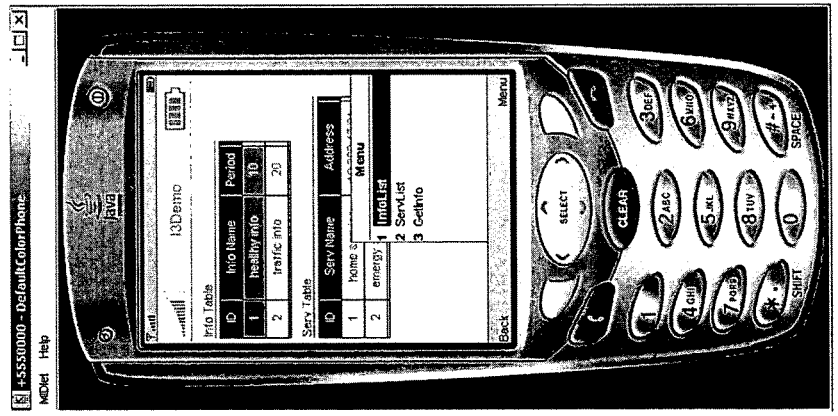
Fig. 10

HANDHELD DEVICE FOR ELDERLY PEOPLE

FIELD OF THE INVENTION

The embodiments of the invention relate to a mobile computing device, such as a cell phone or "handheld" with expanded features and capabilities for elderly persons, children, and others with either health-related issues or the need to monitoring by friends, family members, healthcare personnel, or others. Illustratively, the invention is a middleware application for a handheld/cellular device, that may be remotely configurable, and interacts with network service providers to provide a single-button solution for elderly people requiring assistance and for the notification of multiple parties regarding the nature of the required assistance.

BACKGROUND

Handheld computing devices, such as cellular phones, have become extremely common. As the popularity of such devices has grown, their size has decreased while their complexity has increased. The result of this trend has made these devices increasingly difficult for elderly persons, children, persons with disabilities to configure and operate. Therefore, in emergency situations, such as a medical emergency, a person may not be able to operate the cell phone to obtain the assistance they require, or even if they manage to contact emergency services, many people may not be able to also inform friends, family, or others that they are in need of service. Moreover, in extreme medical emergencies, the person may not be able to provide emergency responders with adequate information, thereby possibly delaying the dispatch of proper assistance and increasing diagnosis time.

One aspect of cellular/handheld computing devices which has caused an increase in complexity of such devices is the growing set of applications and features provided via the middleware application installed on the device. Middleware applications run on top of the device's operating system and provide features that many users find very valuable. These applications often provide features such as wallpapers, ring tones, photo galleries, contact and address books, calendars, etc. Many of such features are provided by applications running over the middleware.

As the number of applications that the middleware supports grows, the complexity of configuring and using a handheld device grows, making the devices more difficult for elderly persons, children, persons with handicaps, etc. to use. Further complicating the issues involved for many people are the small buttons, font sizes, and other constraints of handheld devices. Moreover, applications presently available to run on middleware applications lack the ability to communicate with one another. Thus, for example, a contact database stored by a contact manager program in a present-day handheld cannot pass information to another applications installed on the device, such as email address, phone numbers, etc. This results in the repetitive input of data and may cause further inconvenience to many users.

Finally, present-day handheld devices do not offer the ability for those with medical conditions to share information remotely with healthcare professionals, nor do they provide users with the ability to configure their devices to contact multiple parties in the event of emergency. While some devices are equipped with a single-button option for dialing the "911" emergency service or a single contact (using "speed dial"), the art fails to provide a device in which a single button can be used to do such as things as request medical assistance, have that request sent to a person's personal physician, and also provide notification to friends or family members that assistance has been requested. Further, during the request for assistance there are no devices are which can provide vital signs information to the responder, or other real-time data that could be used to minimize diagnosis time during critical situations.

BRIEF DESCRIPTION OF THE DRAWINGS

FIG. 7 illustrates aspects of a remote configuration service for a handheld device.

FIG. 10 depicts illustrative screen displays of the housekeeping/maintenance service of the present invention.

DETAILED DESCRIPTION

Figure 1:
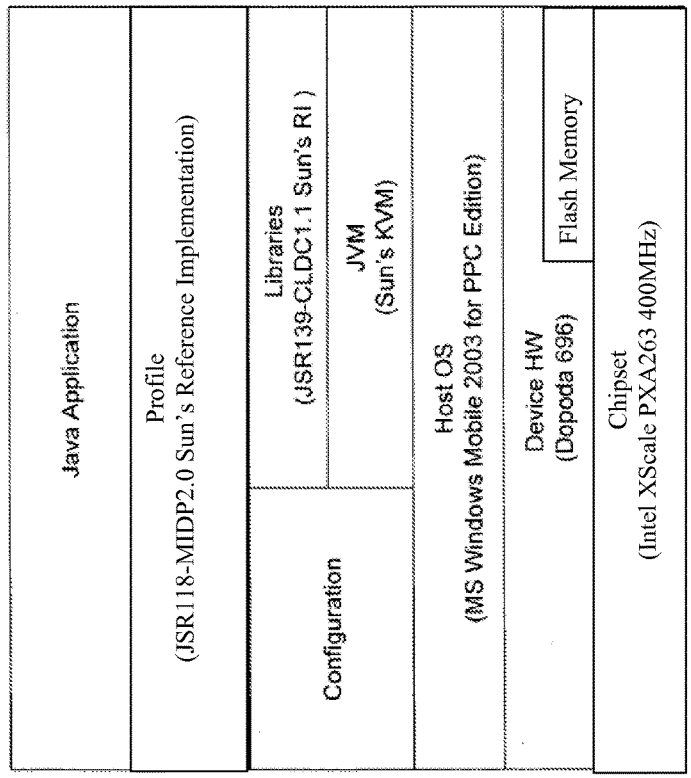
FIG. 1 is a representative illustration of a hardware platform architecture for a handheld device employing a java-based middleware.

As used in the specification and claims, the singular forms "a", "an" and "the" include plural references unless the context clearly dictates otherwise. For example, the term "an array" may include a plurality of arrays unless the context clearly dictates otherwise. Table 1, below, recites certain definitions and acronyms used herein.

TABLE 1

| Acronym/Term | Definition |
| --- | --- |
| API | Application Programming Interface |
| SDK | Software Development Kit |
| OS or O/S | Operating System |
| SMS | Short Message Service |
| GPS | Global Positioning System |
| Middleware | A software application configured to run over an operating system and below application programs. |

The invention may be characterized as a middleware application for handheld devices that runs on top of the device's operating system. The middleware application may provide applications and features to the handheld devices, such as the ability to select wallpapers, ring tones, set volumes, store and manage contacts, etc. In addition, the middleware may also provide inter-application communication, a feature not presenting prior-art middleware applications, to allow one application, for example, to draw upon information entered into and stored by another application (a phone book, for example). In addition, the middleware may provide an SDK for third-party developers to create new applications to install over the middleware which may also allow programmers to take advantage to various API's within the middleware application.

In one embodiment, the invention may comprise a computer-readable storage medium containing a set of instructions for a computing device having a user interface comprising a keypad and a screen display, the set of instructions. The instructions may include, but not be limited to, the steps of recognizing an input from the keypad; determining a service associated with the input; initiating the service; determining a geographic location of the computing device; generating a message including the geographic location of the computing device; querying a database to identify at least one message recipient; and transmitting the message to the at least one message recipient via a network service provider. Further, unless required by the hardware architecture of a chosen handheld platform, or to achieve the objective of the service selected by the user, the order of these steps is merely illustrative.

In another embodiment, the invention is an inventive middleware application that runs on top of an operating system and provides a handheld device with the ability to run various applications. The middleware application for a handheld device may comprise an emergency locator service configured to run in an active mode; an emergency locator service configured to run in a passive mode; a digital health monitoring service; a name card exchange service; and/or a housekeeping maintenance service. Other applications may, of course, be installed to run over the middleware, such as configuration utilities, video galleries, photo scrapbooks, contact/address books, calendars, etc.

In another embodiment, the invention relates to a computing device, such as a handheld device. The handheld device may comprise a central processing unit; an operating system; a plurality of input keys; and a middleware application. The middleware application may be configured to provide emergency locator services when a single key is pressed and/or applications including, but not limited to, an emergency locator service configured to run in an active mode; an emergency locator service configured to run in a passive mode; a digital health monitoring service; a name card exchange service; and/or a housekeeping maintenance service.

The middleware, in an illustrative embodiment, may comprise one or more of the following applications: an emergency locator service, a digital health monitoring service, a remote configuration service, an information exchange service, and/or a maintenance/utility service. The services can be installed as applications running on top of the middleware or integrated into the middleware itself. As well, each service may communicate with any other service installed on the middleware and also make use of local capabilities of the handheld, such as Bluetooth wireless communications (for local P2P networking, or for communication with devices such as medical information monitors), WiFi, etc.

FIG. 1 illustrates an exemplary hardware/software platform for use according to the present invention. The middleware is preferably written in a non-platform specific programming language, such as Java, to allow it to be installed on the widest possibly variety of hardware devices. The hardware, itself, may include most handheld, palmtop, or similar cellular devices, such as those produced by companies including Nokia, Motorola, Ericsson, LG, Samsung, and others. In a preferred embodiment, the hardware may include enlarged buttons and appliques to facilitate usage by those with poor eyesight or limited dexterity. The hardware may also include an enlarged screen to accommodate larger font sizes for those with poor eyesight.

Scenario One—Emergency Locator Service (Active Mode)

Figure 2:
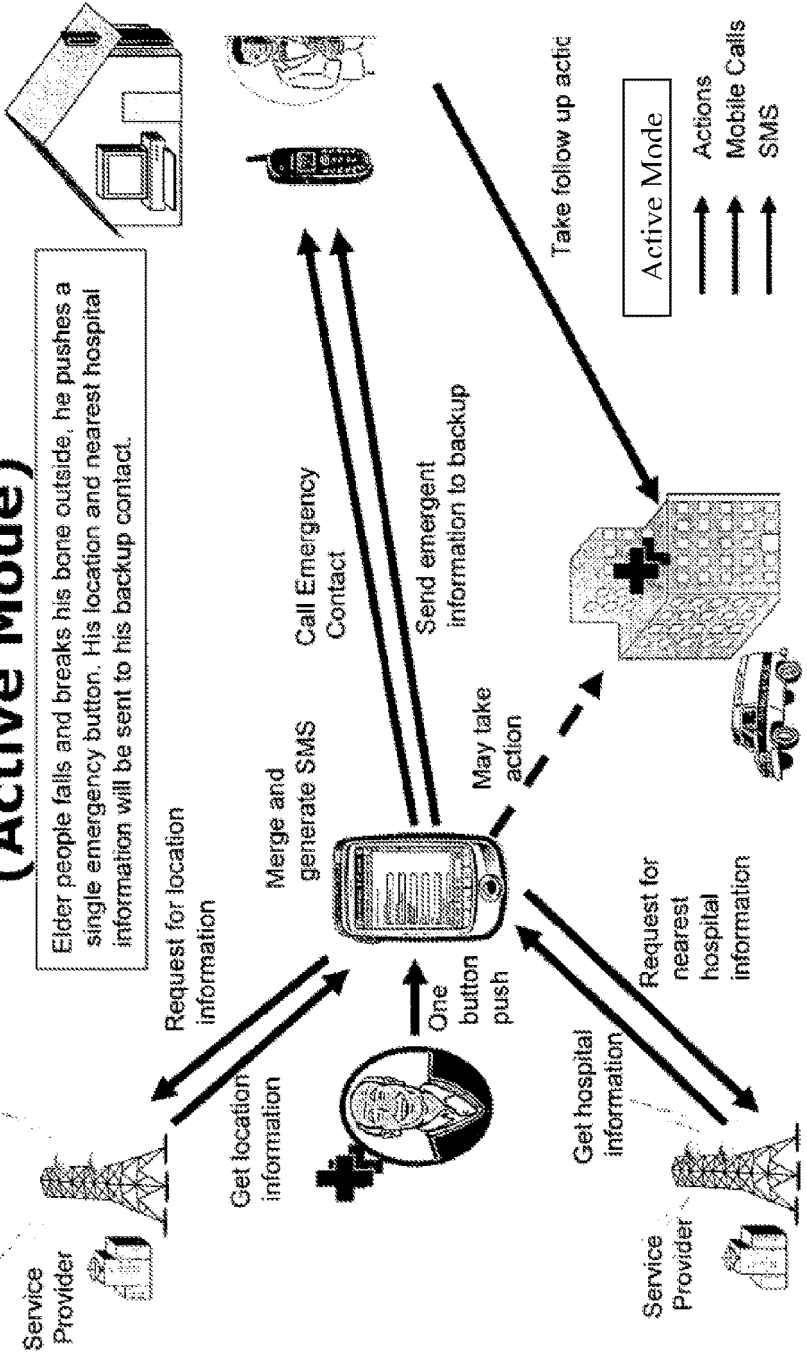
FIG. 2 is a exemplary illustration of a scenario employing the emergency locator service of the present invention in active mode.

As illustrated in FIG. 2 in an exemplary embodiment, the present middleware application permits a user's handheld device to perform a number of actions, in response to a single button-push. In the instance illustrated in FIG. 2, the button-push indicates that the person using the handheld device is elderly and is in need of medical attention. This embodiment of the invention illustrates the use of an emergency locator service in active mode.

The emergency locator service, in active mode, initiates with the press of a single emergency button. Unlike the traditional "911" emergency service, which would connect the handheld user with an emergency services dispatcher, the present middleware may contact a service provider and receive a response from the provider which allows the device to determine the exact location of the user. The means for determining the user's location may, for example, use a satellite-based global positioning system (GPS).

The device may also contact a service provider to identify and locate the nearest hospital to the user's location and receive the requested information from the network service provider. Thereafter, the device may send a text message (using SMS, for example) or voice message to contact the user's "emergency contact". Typically, however, message sent out from the device to contacts would be in text format.

The emergency contact may include a 911 emergency services dispatcher, their personal physical, etc. In addition, the device may also contact a backup/secondary emergency contact, such as a friend or relative and provide them with information via text message. Such information may include the location of the user, the location of the hospital, etc. where the handheld device user is to be taken by emergency personnel.

Scenario One—Emergency Locator Service (Passive Mode)

Figure 3:
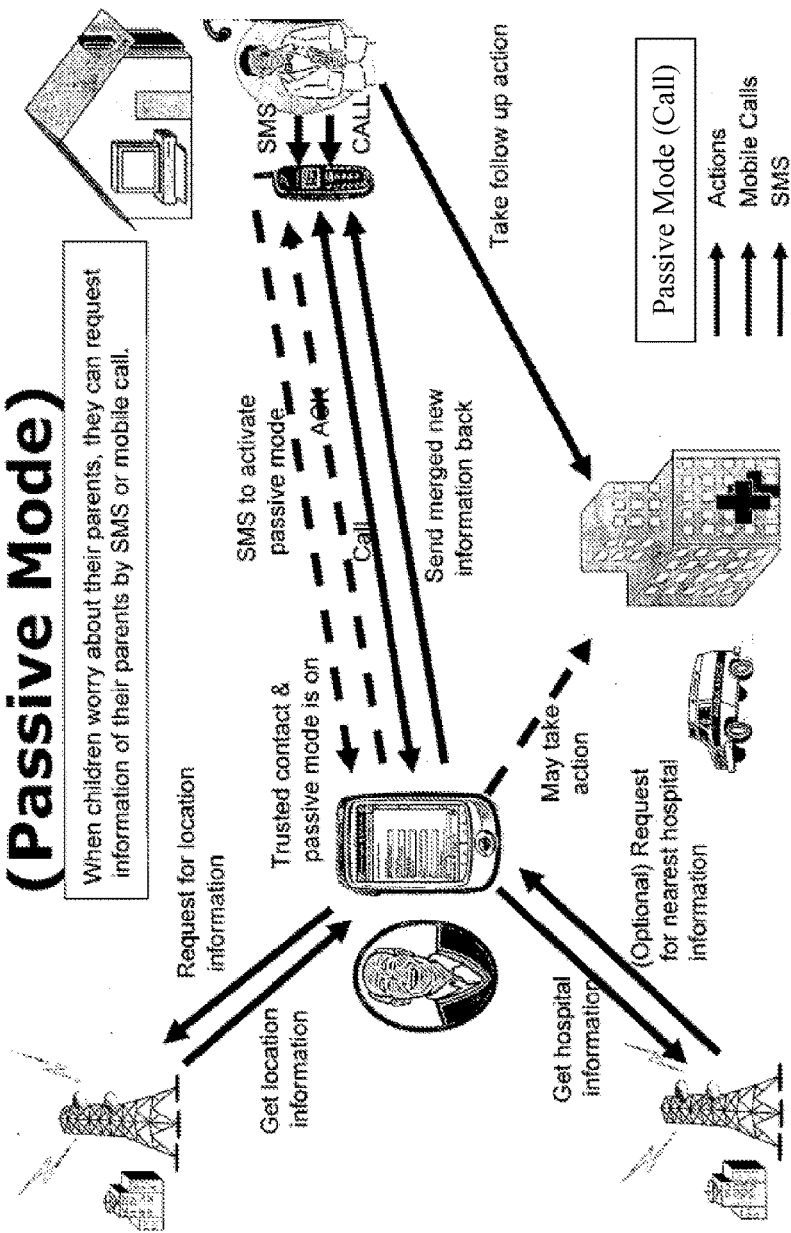
FIG. 3 illustrates an embodiment of the invention including the emergency locator service and the passive mode of operation.

Passive mode is a feature of the emergency locator service that may be initiated by someone other than the user of the handheld device. An example of this mode of operation is illustrated in FIG. 3. In this example, an authorized acquaintance of the user of the device, such as a friend, relative, physician, etc., may be granted access to a user's handheld device and permission to activate passive mode. In this mode, the authorized contact may send a message, such as an SMS text message, to the handheld device to activate passive mode.

Once activated in passive mode, the device may then contact a service provider to determine the GPS location of the device and forward that information to the authorized contact. If, for example, an elderly person does not answer their phone or a parent has concerns about their child's location, the parent might be the authorized contact and activate passive mode to learn the location of their child or the elderly person. The authorized contact may be satisfied that there is nothing wrong, upon receipt of the location, or may take further action.

For example, the authorized contact may be concerned that the elderly person they contacted appeared to be at home, but did not answer the phone. The authorized contact may then request additional services or initiate an emergency call by the handheld device. Under these circumstances, the device may carry out the steps recited with respect to the active mode, or other steps may be programmed when an emergency is initiated via an authorized contact.

Scenario Two—Digital Health Monitoring Service

Figure 4:
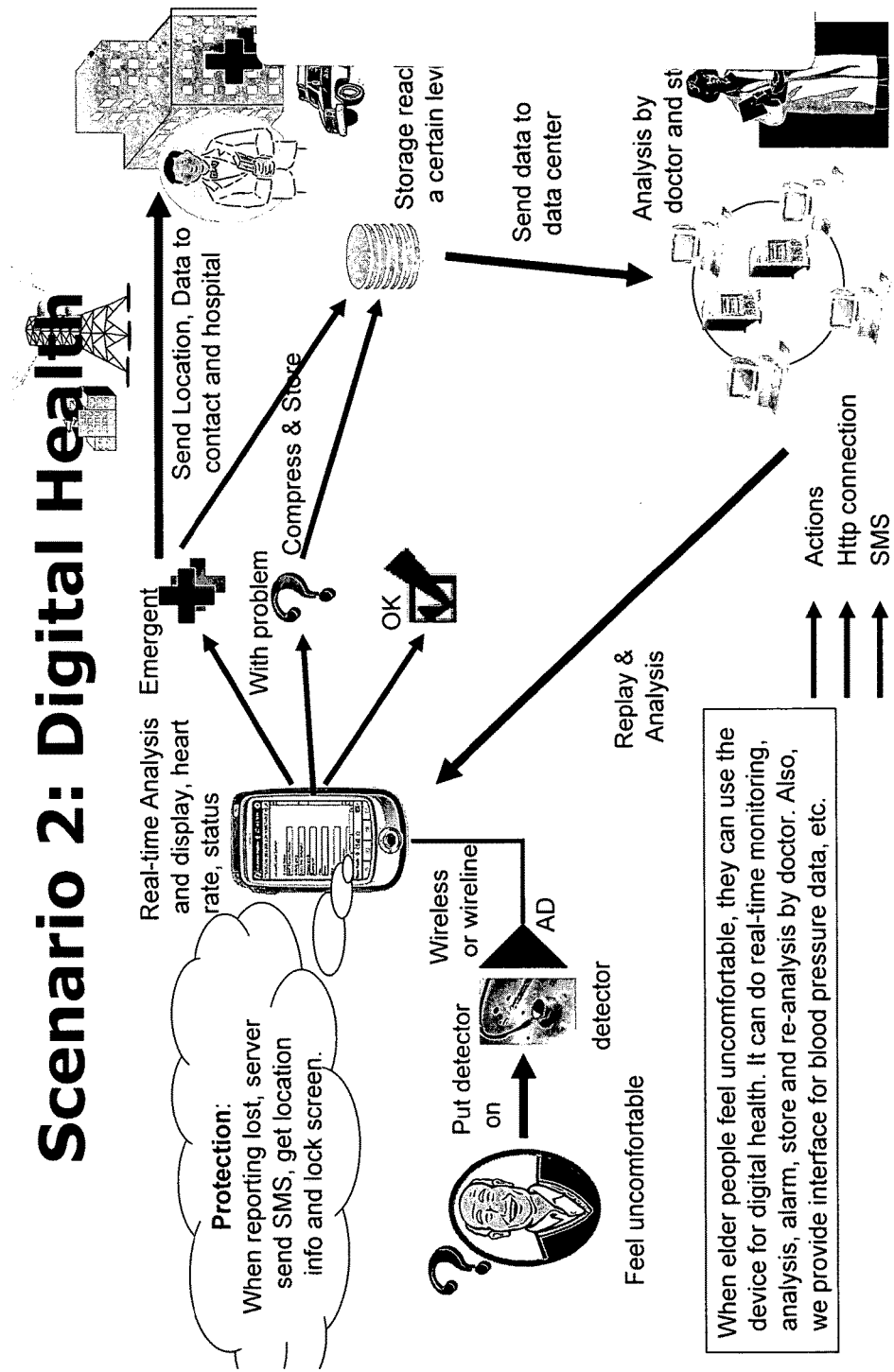
FIG. 4 shows an embodiment of the invention including a digital health monitoring service.

Another embodiment of a handheld device employing the middle of the invention is illustratively shown in FIG. 4. This embodiment may include the use of various wired or wireless detectors, such as heart rate monitors, blood pressure monitors, or other devices which may be configured to connect to the handheld device via either a wired connection or a wireless connection. Wireless connections may be made using the Bluetooth wireless protocol, although those skilled in the art will readily recognize that other wireless protocols may be used.

Figure 5:
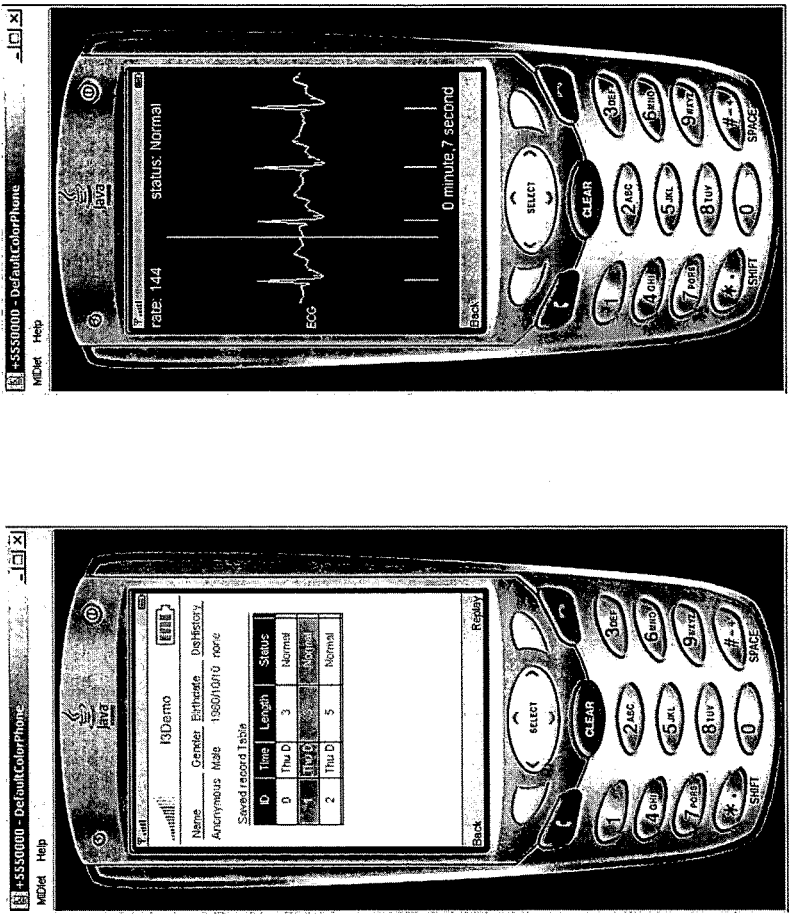
FIG. 5 depicts exemplary screen displays of a digital health monitoring service.

When activated, the digital health monitoring service may receive data from a monitoring device. The exemplary embodiment of FIG. 4 illustrates the use of a heart rate monitor worn by the handheld device user. The present middleware is configured to communicate with the heart rate monitor and to receive data. The data may then be displayed on the screen of the handheld device, as illustrated in FIG. 5, it may be stored for future use, or it may be transmitted in real-time to a healthcare professional or other trusted party.

In an embodiment of the invention, the stored health data may be transmitted (with or without compression) to a data storage center, once the amount of stored data reaches a certain level. To increase the amount of available storage on the handheld device, the data may be compressed by methods known in the art and stored in the handheld device's flash memory or other storage device incorporated into the handheld device.

In another embodiment, the handheld device may continuously monitor the health data receive from a remote probe, such as the heart rate monitor shown in FIG. 4. The digital health monitoring service of the present middleware may be programmed to identify the health status of the handheld device user, based on the data received from the remote probe. For example, the digital health monitoring service may identify an emergency situation when it fails to detect a heart beat, it may identify a "problem" situation when an irregular or abnormal heartbeat/heart rate is detected, or it may identify an "ok" situation when it detects a normal heart rate/rhythm. Of course, these are merely exemplary; and other probe-types may acquire other sorts of medical data, although each of which may be used to identify emergencies, problems, or normal conditions. The device may also be configured to employ multiple remote probes simultaneously, to acquire a greater amount of health status information about the user.

In the situation where the device identifies that the handheld user's health status is "ok", the device may be configured to take no action or, alternatively, it may send a message, which may or may not include recent or historical data received by the handheld device from the remote probe, to a healthcare professional, secondary contact, friend, relative, etc. In doing so, the digital health monitor may communicate with other applications running on the handheld via the middleware, such as a configuration applications that contains instructions for handling a given situations (such as an "ok" state or an "emergency" state). The digital health monitoring service may also communicate with an address/contact book to find the contact information for persons listed in the configuration program. These examples are not, however, exhaustive of the embodiments of the invention wherein inter-application communication is used.

In the event that a "problem" is identified by the digital health monitoring service, the digital health monitoring service can have been configured to initiate one or more events. Configuration can take place remotely or locally at the handheld and the digital health monitoring service may be configured directly or configuration may be done via a separate application which may communicate with the digital health monitoring service. As shown in FIG. 4, one possible result of a "problem" situation is to send recent heath status data from the handheld device to a data center for storage and analysis. At approximately the same time, messages may be sent to a healthcare professional alerting them of the problem and requesting analysis of the recent data. Messages notifying other contacts may be sent, depending on how the application is configured.

If an "emergency" situation is detected, the application may be configured to initiate an emergency procedure similar to that initiated by the emergency locator service. In that instance, the application may be configured to notify the "911" emergency service, the handheld user's healthcare provider, and other secondary contacts. As well, the device may contact a network service to obtain information that can permit it to determine the location of the handheld device using, for example, GPS. The device may also contact a network service that provides the location of the closest healthcare facility to the handheld user's location, lookup contact information in the handheld's address book, and forward a message to a predetermined contact notifying them of the emergency situation and hospital or healthcare facility where the handheld user is being taken. Of course, in addition to any steps performed similar to the emergency locator service, any message as a result of an emergency situation identified by the digital health monitoring service may also include real-time health status information.

In another embodiment of the invention, measures may be implemented to protect the privacy of the data stored on the handheld device. Privacy concerns, particularly relating to the loss or theft of portable computing devices, have risen dramatically in recent years. Those using a handheld device that not only contains personal information, contact information, etc. may also have substantial privacy concerns regarding the acquisition and storage of medical information by their handheld device.

To address these concerns, the inventive middleware application of the present invention provides safeguards against unauthorized access to data stored on the handheld device, in the event of loss or theft. These measures may include a "screen lock" feature that can be implemented by a remote server, following a report from an authorized user or the owner of the handheld device. Illustratively, a service provider may receive a telephone call or other message in which the identify of the caller/reporter can be verified, reporting the loss or theft of their handheld device.

The server, upon verification of the caller/reporter's identity, may send an SMS, or other format, message to the device. The device may then initiate a routine that contacts another network service provider to determine its exact location, which may then be reported to the user's service provider, law enforcement, etc. As well, the device may be remotely instructed to lock the display screen, to inhibit the unauthorized viewing of personal information, medical data, or other information stored on the device. More aggressive means of inhibiting usage of the handheld device may, of course, be implemented remotely, in the event that the device is lost or stolen.

Scenario 3—Remote Configuration Service

Figure 6:
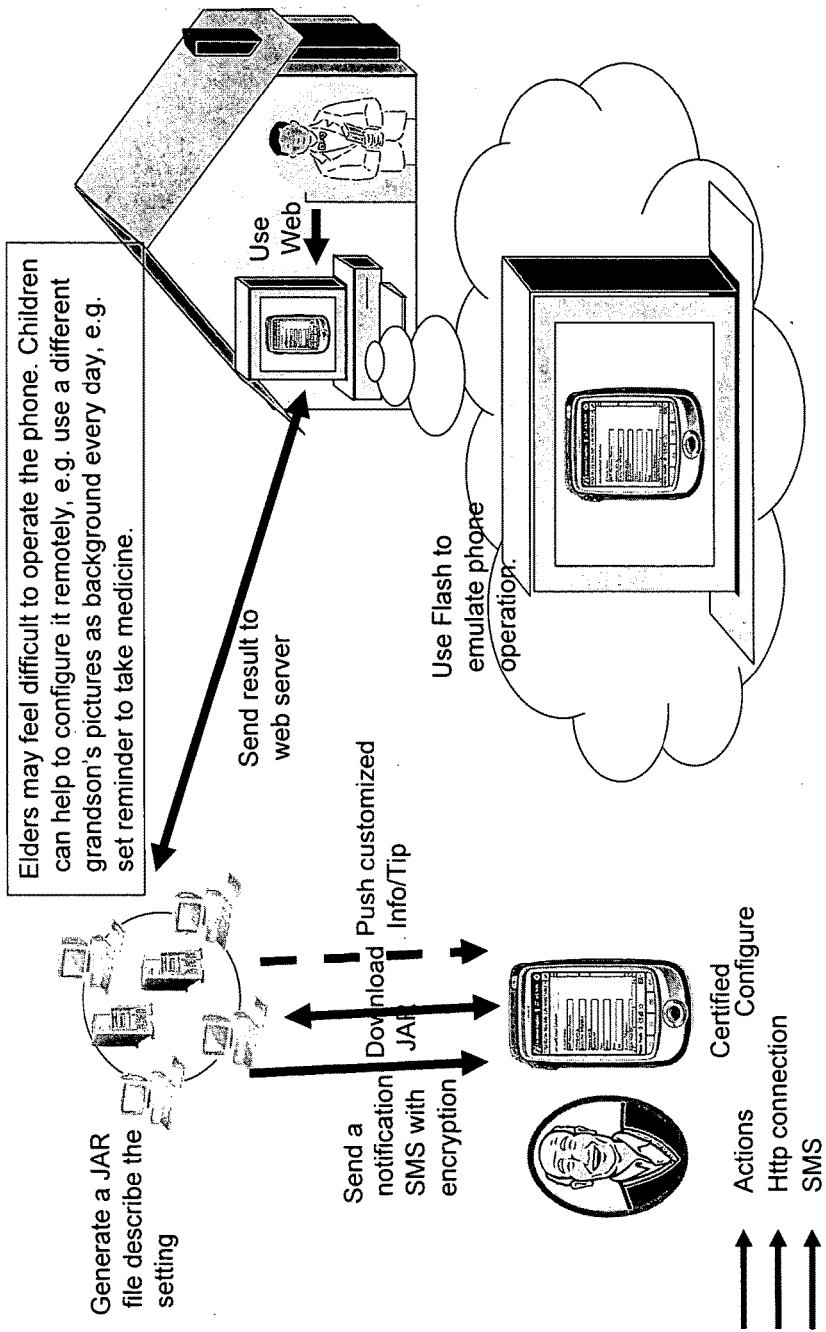
FIG. 6 illustrates an exemplary embodiment of a remote configuration service for a handheld device.
Figure 8:
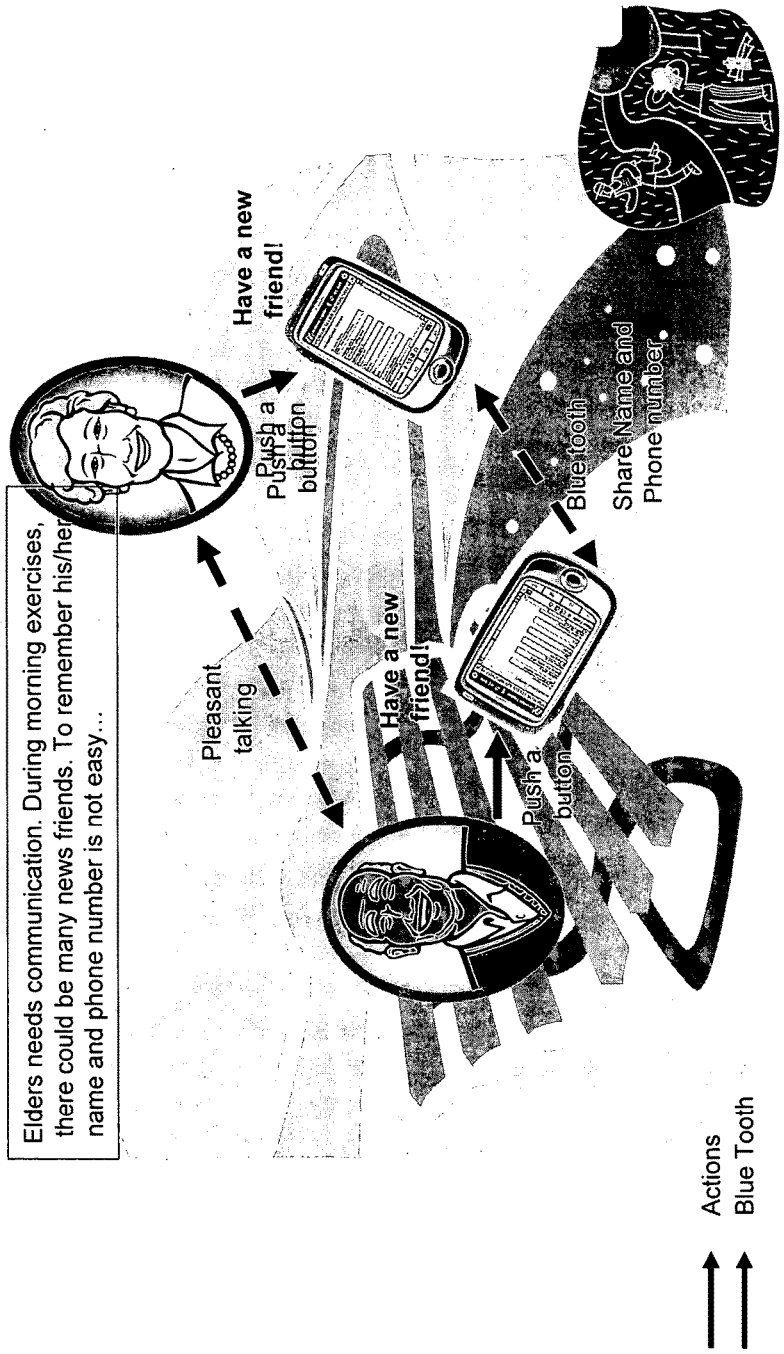
FIG. 8 depicts an embodiment of the present invention permitting name card exchange between handheld devices.

In another embodiment of the invention, the presently disclose handheld device having a novel middleware application may also be configured to permit remote configuration of the handheld device. As illustrated in FIG. 6, a person who is unable to (or simply wishes to permit another party to) configure their handheld device may establish permissions on the device for remote configuration. Such permissions might be included in a field within the address/contact database stored on the handheld device (in flash memory, for example) or within a separate configuration utility. The permissions could allow for varying levels of access to the configuration of the handheld, including features such as setting ring tones, display wallpapers, adding, editing, and/or deleting reminders, downloading ring tones and photographs, managing accounts with service providers (for example, a parent may wish to monitor and pay for a child's service with a cellular network service provider and/or limit the child's access to downloadable features that incur added expense) configuring emergency/secondary contact information, etc. Ideally, the remote configuration service may allow a remote user complete access to all features of the handheld. In practice, however, certain handheld hardware platforms may not permit complete remote access.

Illustratively, an application on a secure website may be available that permits a remote user to login. A web-based application, written in a language such as Macromedia's "Flash" programming language may be used to emulate the operation of the phone via a web browser. Exemplary screen displays for the web-based configuration utility and handheld device are shown in FIG. 7. Once the configurations settings have been set via the "Flash" application, the settings may then be forwarded to a web server that converts the settings into a file format that can be transferred to the handheld device, such as a "JAR" file . As used herein, the term "JAR" refers to a JAVA Archive file. A filetype used in accordance with the JAVA programming language.

The web server may then send an encrypted SMS notification message to the handheld that new settings are waiting to be downloaded. The handheld device could then compare the authorization of the remote user to its stored permissions and determine whether to permit the new settings to be downloaded and installed. If the permissions for the remote users are acceptable, the data transfer may take place between the web server and the handheld device and the settings may be "pushed" to the device. Once present on the device, the new settings may again be analyzed to determine whether some or all of the configuration information falls within the permissions of the remote user prior to installation.

Scenario 4—Name Card Exchange Service

In another embodiment of the invention, the handheld device with the presently disclosed middleware application may permit the electronic, wireless transfer of data and information between similarly capable devices. An example of such data transfer might include sharing contact information, such as name, email address, physical address, telephone numbers, etc. The type and amount of information that can be included in a "name card" is at the discretion of the programmer creating the name card application to run on the middleware.

By way of example, a handheld device user may meet another person with whom they wish to share personal information. Traditionally, people would do so by either writing down the information and giving to the other person for manual entry into their own handheld device, or with the case of phone numbers one person may call another person who can then store the phone number from which they received the call (if it is, in fact, available) in their contact database. This process can be time consuming, prone to error, and difficult for those with limited dexterity, poor eyesight, or a lack of familiarity with programming techniques for their handheld device.

The inventive name card exchange service, however, eliminates the need to transfer information manually between users of similarly equipped devices. According to this embodiment, persons who wish to share contact information, or name cards, can do so by pushing a button designated on their handheld device for name card sharing. By pushing the appropriate button, the handheld device may transmit the name card information using a protocol such as the Bluetooth wireless protocol. Any devices configured to receive name card information that are within the range of the transmitter may then receive the information and either store it automatically or prompt the user as to whether they wish to store the information in their contact/address book.

Scenario 5—Housekeeping/Maintenance Service

Figure 9:
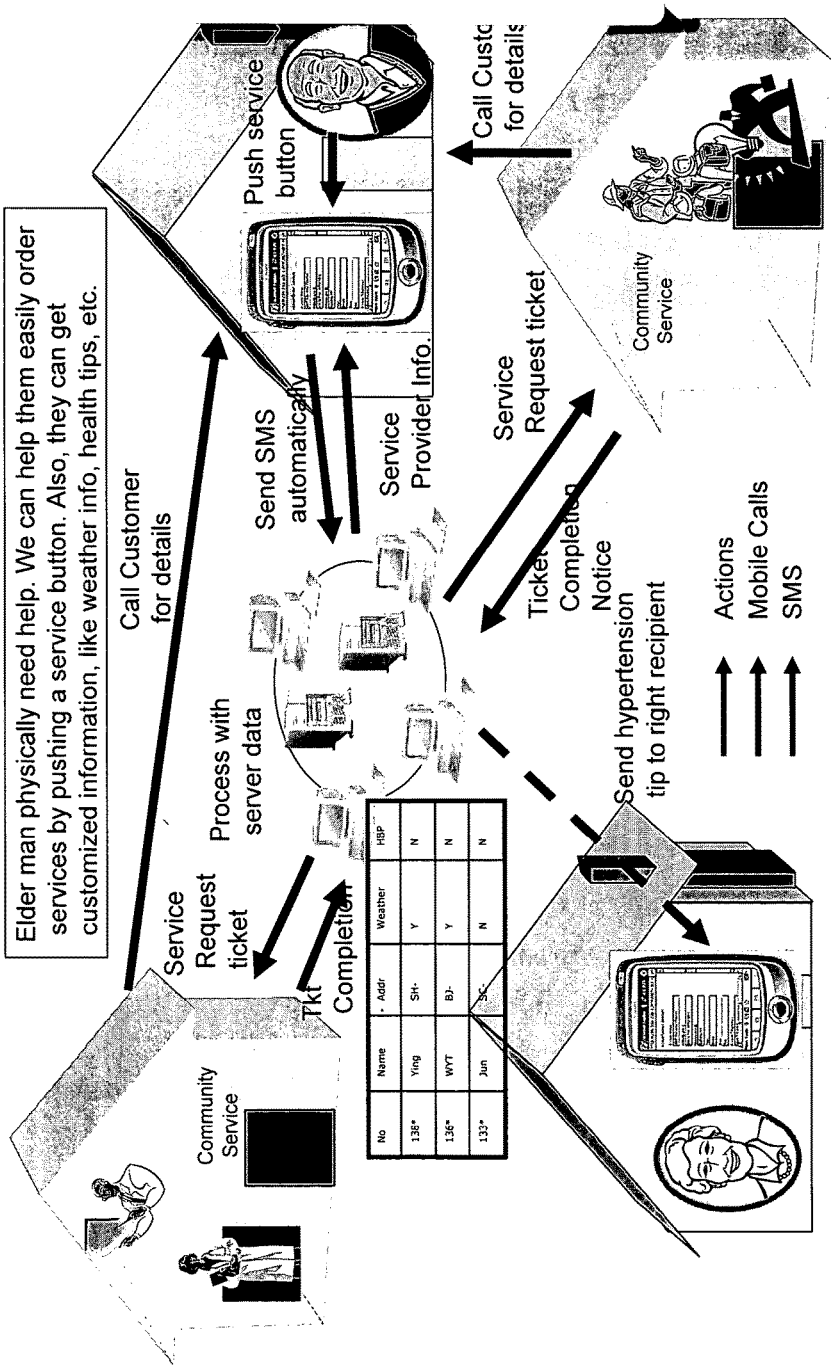
FIG. 9 shows an exemplary embodiment of the housekeeping/maintenance service of the present invention.

Elderly people, people with disabilities, and others may benefit from an embodiment of the invention that may locate and schedule various housekeeping and maintenance services quickly and efficiently. As illustrated in an exemplary embodiment, FIG. 9 shows that a user of a handheld device may request services via their handheld device. Such service might include, but not be limited to, home repairs and maintenance, cleaning services, product purchases and deliveries, etc. The handheld device may then contact a network service provider to obtain a list of service providers who can fill the request and the list of available providers may be sent to the handheld device. Thereafter, the user may sort the available providers by their availability to fulfill the request, price, or other factors (such as a rating provided in response to a query to an online ratings service).

The network service provider may then receive an "order" for services from the user via the handheld device. The network service provider may then forward a request to the user's selected housekeeping/maintenance service provider and request a that a service "ticket" be opened, so that the progress of the fulfillment of the order can be tracked. The housekeeping/maintenance service provider may then contact the customer to obtain additional information, confirm the order, or simply provider the product or service in the case where no additional information is required. Once the service is completed or product delivered, the ticket is closed by the housekeeping/maintenance service provider and notification is sent to the network service provider. Notice may then be sent to the handheld device that the ticket is closed. An illustrative screen display for a handheld device running the housekeeping/maintenance service is shown in FIG. 10.

In order expedite the procurement of services, the user's address, billing information, and other data may be automatically sent with a request for service, thereby eliminating the need to provide the information in each instance where the user of the handheld device request service. Safeguards may be incorporated into the present housekeeping/maintenance service to ensure that products and service are not ordered by unauthorized persons. Such safeguards may include passwords, pin numbers, or other techniques known in the art.

Further, since each request for products or services is routed via a network service provider, the provider may quickly build a profile for each user that exhibits their preferences and interests. The network service provider may then "push" messages and information to the handheld device to provide the user with information relevant to their preferences and interests. For example, a person that regularly orders hypertension medication may periodically receive tips on relieving or reducing hypertension, drug interaction warnings, or other information that may be beneficial or interesting to them.

Figure 11:
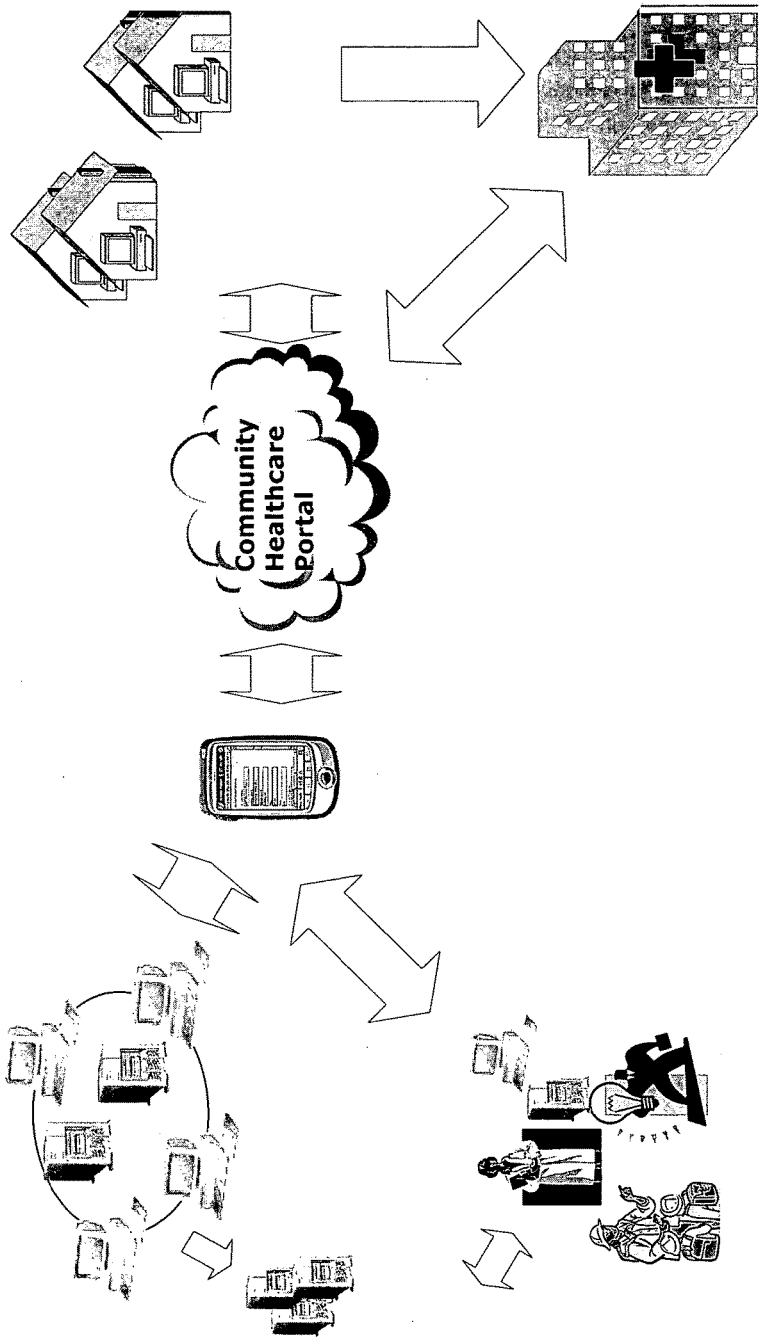
FIG. 11 illustrates an embodiment of the connectivity network of an embodiment of the invention employing multiple services.
Figure 12:
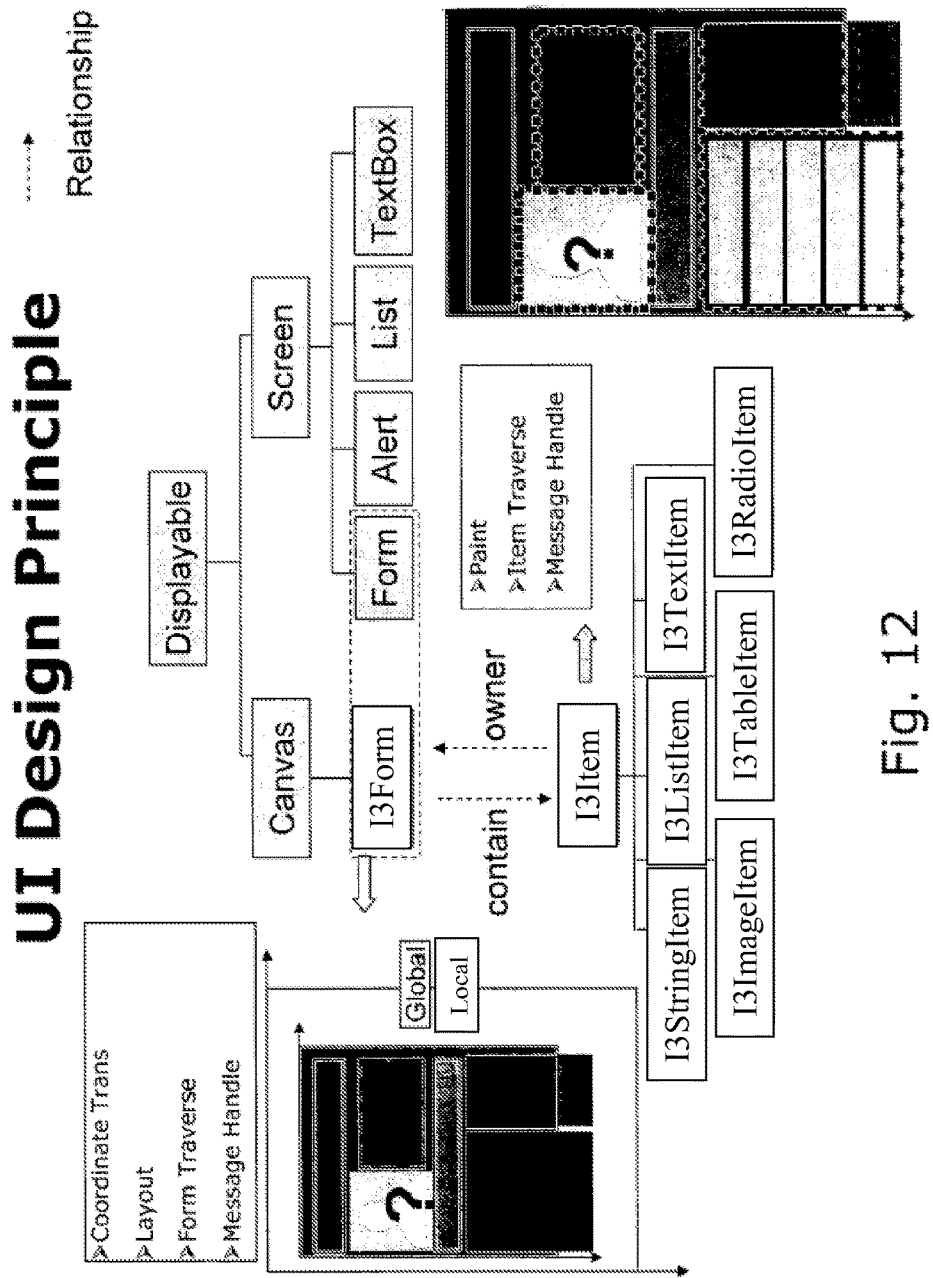
FIG. 12 depicts exemplary user interface design elements and an architecture for implementing these elements in accordance with an embodiment of the invention.

An exemplary networking structure for a device used in accordance with the present invention is illustrated by FIG. 11. Further, exemplary user interface design elements and architecture are illustrated by FIG. 12.

This application discloses several numerical range limitations that support any range within the disclosed numerical ranges even though a precise range limitation is not stated verbatim in the specification because the embodiments of the invention could be practiced throughout the disclosed numerical ranges. Finally, the entire disclosure of the patents and publications referred in this application, if any, are hereby incorporated herein in entirety by reference.

The invention claimed is:

1. A handheld device comprising:
a central processing unit;
an operating system;
a plurality of input keys; and
a middleware application, wherein the middleware application is configured to support a plurality of services that are arranged to interact with network service providers, the plurality of services including an emergency locator service, a digital health monitoring service, a name card exchange service, a remote configuration service and a housekeeping and maintenance service,
wherein the middleware application is operable to initiate at least the emergency locator service in an active mode and a passive mode, wherein in the active mode, the emergency locator service is initiated in response to a single one of the plurality of keys being pressed by the user, and in the passive mode, the emergency locator service is initiated by a remote user by sending a text message to the handheld device,
wherein, upon initiation, the emergency locator service is configured to initiate communication with an emergency locator service provider, determine, based on information received from the emergency locator service provider, a location of the handheld device and locations of one or more emergency service centers nearest to the handheld device, and notify one or more recipients listed in a list of receipts stored in a memory of the device as to the location of the device and the determined one or more emergency service center, and
wherein the housekeeping and maintenance service is configured to receive a request for housekeeping maintenance services, and in response to receipt of the request, automatically transmit an address of the user, billing information of the user, and the request to a housekeeping maintenance service provider.

2. The device of claim 1, wherein the emergency locator service is configured to determine a geographic location of the handheld device using a global positioning system.

3. The device of claim 1, wherein the middleware application is configured to create a message that includes geographic location of the handheld device.

4. The device of claim 3, wherein the middleware application is configured to send the message to the one or more recipients via a network service provider.

5. The device of claim 1, wherein the middleware application is configured to receive a request from a remote user to provide a geographic location of the handheld device and to provide a geographic location of the handheld device to the remote user.

6. The device of claim 1, wherein the middleware application is configured to create a message including the geographic location of the handheld device and send the message to a. remote user using SMS.

7. The device of claim 1, further comprising a health data acquisition device, the health data acquisition device comprising a wired health data acquisition device ora wireless health data acquisition device.

8. The device of claim 7, wherein the health data acquisition device is a heart rate monitor or blood pressure monitor.

9. The device of claim 7, wherein the middleware application is configured to transmit data received from the health data acquisition device to a network service provider in real time.

10. The device of claim 7, wherein the middleware application is configured to identify a health state of a user of the handheld device.

11. The device of claim 10, wherein the middleware application is configured to create and send a message notifying one or more predefined parties of the health state of the user of the handheld device.

12. The device of claim 7, wherein the middleware application is configured to lock a screen display of the handheld device upon receipt of an instruction received via a network service provider.

13. The device of claim 1 wherein the middleware application is configured to receive and install configuration data for the handheld device via a network service provider.

14. The device of claim 1, wherein the middleware application is configured to transmit and receive name card data.

15. The device of claim 14, wherein the device is configured to transmit and recieve data wirelessly.

16. The device of claim 15, wherein data is transmitted and received using the Bluetooth wireless data protocol.

17. A handheld device, comprising,
a central processing unit;
an operating system running on the central processing unit;
a keypad in electronic communication with the operating system; and
a middleware application running on the operating system, wherein the middleware application is configured to support a plurality of services that are arranged to interact with service providers, wherein the plurality of services are configured to communicate with each other, the services including an emergency locator service, a digital health monitoring service, a name card exchange service, a remote configuration service and a housekeeping and maintenance service,
wherein the middleware application is operable to initiate at least the emergency locator service in an active mode and a passive mode, wherein in the active mode, the emergency locator service is initiated in response to a single one of the plurality of keys being pressed by the user, and in the passive mode, the emergency locator service is initiated by a remote user by sending a text message to the handheld device,
wherein, upon initiation, the emergency locator service is configured to initiate communication with an emergency locator service provider, determine, based on information received from the emergency locator service provider, a location of the handheld device and locations of one or more emergency service centers nearest to the handheld device, and notify one or more recipients listed in a list of receipts stored in a memory of the device as to the location of the device and the determined one or more emergency service centers when a single key of the keypad is pressed, and wherein the housekeeping and maintenance service is configured to receive a request for housekeeping maintenance services, and in response to receipt of the request, automatically transmit an address of the user, billing information of the user, and the request to a housekeeping maintenance service provider.

18. The device of claim 17, wherein the middleware application is configured to permit communication of contact or address information between applications.

19. Anon-transitory computer-readable storage medium containing a set of instructions for a computing device having a user interface comprising a keypad and a screen display, the set of instructions comprising:

recognizing an input from the keypad;

determining a service associated with the input, the services including an emergency locator service, a digital health monitoring service, a name card exchange service, a remote configuration service and a housekeeping and maintenance service, wherein the housekeeping and maintenance service is configured to receive a request for housekeeping maintenance services, and in response to receipt of the request, automatically transmit an address of the user, billing information of the user, and the request to a housekeeping maintenance service provider; and initiating at least the emergency locator service, wherein the emergency locator service is operable in an active mode and a passive mode, wherein in the active mode, the emergency locator service is initiated responsive to a single key being pressed on the keypad, and in the using a passive mode, the emergency locator service is initiated by a remote user by sending a text message to the computing device, wherein, responsive to said tiling, the emergency locator service performs operations comprising:

initiating communication with an emergency locator service provider;

determining, based on information received from the emergency locator service provider, a geographic location of the computing device and locations of one or more emergency service centers nearest to the computing device;

generating a message including the determined geographic location of the computing device and the determined locations of the one or more emergency service centers nearest to the computing device;

querying a database to identify at least one message recipient;

transmitting the message to the at least one message recipient via a network service provider; and notifying one or more recipients listed in a list of receipts stored in the storage medium of the device as to the location of the device and the determined one or more emergency service centers when the single key on the keypad is pressed.

20. The computer readable storage medium of claim 19, wherein the storage medium comprises a non-volatile memory.

21. The computer readable storage medium of claim 19 comprising acquiring health data from a probe in electronic communication with the computing device.

22. The computer readable storage medium of claim 19 comprising transmitting health data in real time.

23. The computer readable storage medium of claim 19 comprising displaying health data on the display screen in real time.

24. The computer readable storage medium of claim 21 comprising analyzing the health data and determining a health status of a user of the computing device.

25. The computer readable storage medium of claim 19 herein the message includes health data.

26. The device of claim 1, wherein the remote configuration services further include features selected from the group consisting of: setting ring tones, displaying wallpapers, and managing accounts with service providers and configuring emergency or secondary contact information.

27. The device of claim 17, wherein the remote configuration services further include features selected from the group consisting of setting ring tones, displaying wallpapers, and managing accounts with service providers and configuring emergency or secondary contact information.

28. A handheld device comprising:

a central processing unit;

an operating system;

a plurality of input keys; and a middleware application, wherein the middleware application is configured to support a plurality of services that are arranged to interact with network service providers, the plurality of services including an emergency locator service, a digital health monitoring service, a name card exchange service, a remote configuration service and a housekeeping and maintenance service, wherein the middleware application is configured to initiate at least the emergency locator service based on a passive mode, wherein the emergency locator service is initiated by a remote user by sending a text message to the handheld device, wherein upon activation of the passive mode, at least the emergency locator service requests information related to the handheld device from an associated one of the network service providers, and provides the requested information to a remote user, and based on a determination that a condition related to the requested information is met, the middleware application receives a request from the remote user to operate in an active mode, wherein, in the active mode:

the emergency locator service initiates communication with an emergency locator service provider to determine, based on information received from the emergency locator service provider, a location of the handheld device and locations of one or more emergency service centers nearest to the handheld device, and notify one or more recipients listed in a list of receipts stored in a memory of the device as to the location of the device and the determined one or more emergency service centers when a single key is pressed, and wherein the housekeeping and maintenance service is configured to receive a request for housekeeping maintenance services, and in response to receipt of the request, automatically transmit an address of the user, billing information of the user, and the request to a housekeeping maintenance service provider.

29. The device of claim 28, wherein the requested information related to the handheld device includes a geographic location of the handheld device.

30. The device of claim 29, wherein the associated one of the one or more network service providers utilizes a global positioning system to determine the geographic location of the handheld device.

* * * * *

UNITED STATES PATENT AND TRADEMARK OFFICE
CERTIFICATE OF CORRECTION

PATENT NO. : 10,049,077 B2  
APPLICATION NO. : 11/478460  
DATED : August 14, 2018  
INVENTOR(S) : Li et al.

Page 1 of 1

It is certified that error appears in the above-identified patent and that said Letters Patent is hereby corrected as shown below:

In the Claims

In Column 10, Line 7, in Claim 6, delete "a." and insert --a-- therefor

In Column 10, Line 10, in Claim 7, delete "ora" and insert --or a-- therefor

In Column 10, Line 37, in Claim 15, delete "recieve" and insert --receive-- therefor In Column 10, Line 40, in Claim 17, delete "comprising," and insert --comprising:-- therefor In Column 11, Line 16, in Claim 19, delete "Anon-transitory" and insert --A non-transitory-- therefor In Column 11, Line 40, in Claim 19, delete "tiling," and insert --initiating,-- therefor In Column 12, Line 10, in Claim 25, delete "herein" and insert --wherein-- therefor Signed and Sealed this  
Twenty-eighth Day of May, 2019

Andrei Iancu  
*Director of the United States Patent and Trademark Office*